United States Patent [19]
Bock et al.

[11] 4,313,155
[45] Jan. 26, 1982

[54] HIGH INPUT VOLTAGE DC TO DC POWER CONVERTER

[75] Inventors: Donald D. Bock, Erie, Pa.; Kurt K. Hedel, Utica, N.Y.

[73] Assignee: General Electric Company, Erie, Pa.

[21] Appl. No.: 111,616

[22] Filed: Jan. 14, 1980

[51] Int. Cl.³ .............................................. H02P 13/18
[52] U.S. Cl. ......................................... 363/21; 363/71
[58] Field of Search ................................. 363/15–33, 363/56, 71, 65, 72

[56] References Cited

U.S. PATENT DOCUMENTS

| | | |
|---|---|---|
| 3,818,307 | 6/1974 | Hamilton et al. |
| 3,873,903 | 3/1975 | Koetsch et al. ................. 363/25 |
| 3,913,000 | 10/1975 | Cardwell ........................ 363/20 |
| 3,935,526 | 1/1976 | Kamata et al. .................. 363/21 |
| 4,062,057 | 12/1977 | Perkins et al. .................. 363/71 |
| 4,176,392 | 11/1979 | Cronin et al. .................. 363/71 |
| 4,195,333 | 3/1980 | Hedel ............................ 363/21 |

FOREIGN PATENT DOCUMENTS

| | | | |
|---|---|---|---|
| 406410 | 8/1966 | Switzerland ..................... | 363/71 |
| 604104 | 4/1978 | U.S.S.R. ........................ | 363/17 |

OTHER PUBLICATIONS

IBM Technical Disclosure Bulletin, vol. 18, No. 6, pp. 1920, 1921, Nov. 1975.
Roddan, *Transistor Inverters and Converters*, Van Nostrand Co., Inc., pp. 170–171, 1963.

*Primary Examiner*—William H. Beha, Jr.
*Attorney, Agent, or Firm*—Albert S. Richardson, Jr.

[57] ABSTRACT

A modular arrangement of DC to DC Power conversion units which permits variation of power handling capability without changing the power control system. The conversion units of the stagger-mode type including two pulse width modulated converter sub-units are separated into two individually powered and controlled units. First units of all converters are connected in one series string across a power source and similarly the second units of all converters are connected in a second series string across the power source. Each unit has a capacitor connected across its power input terminals so that the source voltage is evenly divided between converters. With this configuration only one converter need have its current monitored in order to balance the current between the two strings of converter units. The system includes current and voltage protection features appropriate to a high current and high voltage environment.

5 Claims, 5 Drawing Figures

HIGH INPUT VOLTAGE DC TO DC POWER CONVERTER

BACKGROUND OF THE INVENTION

The present invention relates to voltage converters and, more particularly, to DC-to-DC voltage converters wherein a plurality of converters are serially connected across a relatively high voltage source to produce a relatively low voltage, high current output.

In various applications wherein low voltage, high current requirements exist, the available source voltage is often too high a magnitude to permit utilization of a single solid-state converter. For example, electric transit vehicles normally operate from a 600 volt direct current (DC) source since that voltage is necessary for the DC motors which propel the vehicle. However, the controls, the lighting and the heating systems on such vehicles typically require a lower voltage in the range of 37.5 volts DC. Although conversion of the 600 volts to 37.5 volts can be accommodated by motor/generator sets or by silicon control rectifiers and silicon steel laminated transformers, such units have historically been both large, heavy and inefficient.

In an effort to reduce the size and weight of converters, conversion systems employing transistor circuits have been developed. However, transistor circuits tend to be limited in their voltage handling capability. Accordingly, it is known to connect several transistorized converter circuits in series across a relatively high magnitude voltage source and to divide the high magnitude voltage into a plurality of smaller increments by use of a plurality of capacitors serially connected across the voltage source with each capacitor being also connected across the power input terminals of a corresponding one of the converter circuits. In this manner each converter circuit is exposed to a predetermined fraction of the total source voltage.

The solid-state converters are necessarily switching converters and in the case of serially connected converters include transformers which enable their multiple output currents to be summed. In the simplest type of converter, a single switching device cyclically connects a transformer primary winding across a power source so that power is inductively coupled to the converter output via the transformer secondary winding. Since it is desired to actually produce a DC output voltage from the converter with minimum ripple content, the transformer and switching device must be capable of operating at relatively high frequency. However, the converter cost escalates appreciably with any increase in the required capability of the components to operate at higher frequencies.

In order to reduce the required frequency capability, full wave converters are commonly employed. However, the full wave converter circuits have potential overlap problems, i.e., simultaneous conduction of switching devices such as transistors at the end of each cycle or simply due to noise may cause high thermal dissipation or failure of a transistor. An alternative to the full wave converter is disclosed in U.S. patent application Ser. No. 910,330 filed on May 30, 1978 by K. K. Hedel and assigned to the General Electric Company (now U.S. Pat. No. 4,195,333). Hedel describes a staggered mode DC to DC converter which utilizes a pair of half-wave transformer coupled stages which attain the power handling advantages of the full wave converter without the potential overlap problem. Furthermore, the Hedel converter significantly reduces the input and output filter requirements, has the ability to run at greater than 50 percent duty factor to hold regulation under low source voltage conditions and incorporates a series connection of the transformer reset windings permitting operation of one of the half-wave sections to aid in the resetting of the transformer in the other half-wave section.

Using the teaching of the prior art to connect a plurality of the Hedel converters in series across the relatively high voltage source produced a converter capable of the desired voltage handling requirements. However, such an arrangement results in an imbalance of current between stages, with the exception of the final stage, which cannot be controlled without additional current regulators. Furthermore, the ripple content of the DC output voltage in such an arrangement is detrimentally effected by such current imbalance.

It is an object of the present invention to provide a DC-to-DC power converter comprising a plurality of series connected converters which is capable of operating at relatively low frequency with relatively low DC voltage output ripple. It is a further object of the invention to provide a DC-to-DC power converter comprising a plurality of series connected conversion units of the staggered mode type in which current balance is maintained without individual regulation of each conversion unit.

SUMMARY OF THE INVENTION

Our invention overcomes the problem of undesirable current imbalance and ripple in the DC output voltage of series connected stagger-mode converters by separating the two stages of each converter and arranging the stages into two parallel regulated power phases. The staggered-mode converter contains two stages, one of which is conductive during a first half-cycle (a phase one stage) and the other of which is conductive during a second half-cycle (a phase two stage). In our invention the phase one stage of each converter is separated from the phase two stage and all the phase one stages are connected in one series string while the phase two stages are connected in a second series string. In each converter the phase one stage is shunted by one capacitor and the phase two stage is shunted by a second capacitor. Thus, when several converters are serially connected, two series strings of capacitors are formed which act as voltage dividers to equally divide the input voltage applied to the converters. With this arrangement a feedback control system responsive only to one of the converters effectively controls and balances the average current through each of the series strings of converter stages so that the currents in all the stages connected in series are forced to be equal. Any tendency of the currents to become unbalanced due to differences in transistor storage time, for example, results in a small change in the voltage on the capacitor connected across that stage which forces the required correction in the average transistor current.

In the preferred embodiment balancing of the current between the phase one and phase two stages is accomplished by varying the conduction time of the phase one stages through a closed loop balance circuit. A current control loop varies the conduction of both the phase one and phase two stages in order to regulate the power output of the system.

BRIEF DESCRIPTION OF THE DRAWINGS

The foregoing and other objects, features and advantages of this invention will be better understood by reference to the following detailed description when considered in conjunction with the accompanying drawings in which.

DESCRIPTION OF THE PREFERRED EMBODIMENT

Figure 1:
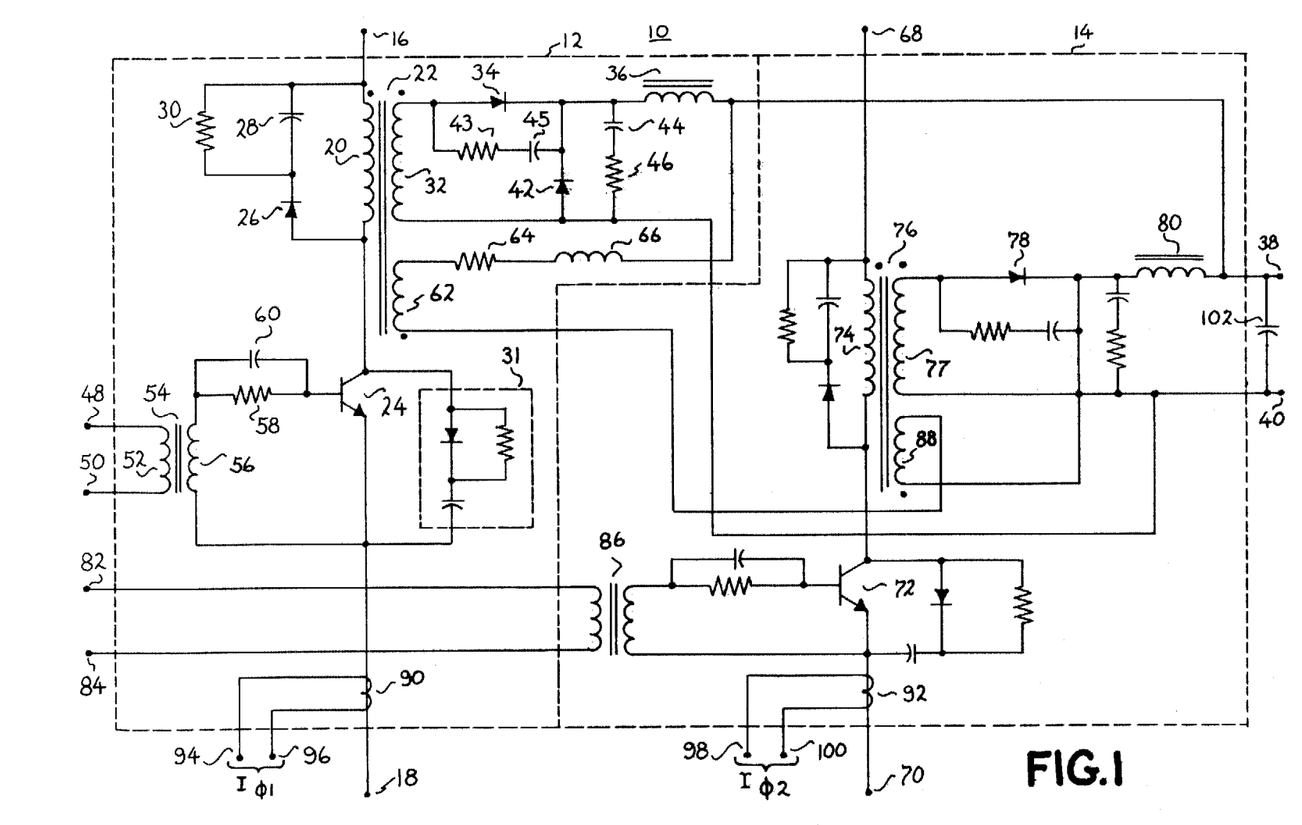
FIG. 1 is a schematic representation of a power circuit of a staggered mode DC to DC converter particularly adapted for use with this invention.

Referring first to the schematic diagram of the power circuit 10 of a staggered mode DC to DC voltage converter shown in FIG. 1, it will be noted that the power circuit 10 is comprised of two single ended conversion units identified at 12 and 14. For purposes of illustration, the unit 12 will be referred to as the phase one ($\phi 1$) unit and the unit 14 will be referred to as the phase two ($\phi 2$) unit. The power circuit 10 is substantially identical to that circuit shown in U.S. Patent application Ser. No. 910,330 filed May 30, 1978 on behalf of Kurt K. Hedel and assigned to the General Electric Co. (now U.S. Pat. No. 4,195,333). A major distinction between the Hedel power circuit and that shown here is that the power input terminals for the two conversion units 12 and 14 have been separated.

The $\phi 1$ conversion unit 12 is provided with first and second power input terminals 16 and 18. Connected between the input terminals 16 and 18 are a primary winding 20 of a single ended power transformer 22 and a power switching device shown as a transistor 24. Transistor 24 has alternative conducting and non-conducting states and functions as a switching means to permit the power applied across terminals 16 and 18 to be applied to the transformer winding 20. A surge suppression or snubber circuit comprising a diode 26, capacitor 28 and resistor 30 is connected across the primary winding 20. A load line shaping circuit 31 is connected across the collector-emitting junction of transistor 24.

Output power from the conversion unit 12 is developed across secondary winding 32 of transformer 22. One end of secondary winding 32 is connected via a rectifying diode 34 and filter reactor 36 to a first output terminal 38 of the power circuit 10. A second end of winding 32 is connected directly to a second output terminal 40 of circuit 10. A load free wheeling diode 42 is connected in parallel with the series combination of winding 32 and rectifying diode 34 to provide a path for the load current during reset of transformer 22. A snubber circuit comprising a resistor 46 and a capacitor 44 is connected in parallel with diode 42. A snubber circuit comprising a resistor 43 and a capacitor 45 is also connected in parallel with diode 34.

Control of transistor 24 is affected by signals applied to control terminals 48 and 50, which terminals are connected, respectively, to first and second terminals of a primary winding 52 of a signal transformer 54. A secondary winding 56 of transformer 54 has one terminal connected to an emitter terminal of transistor 24 and a second terminal connected through a resistor 58 to a base terminal of transistor 24. A capacitor 60 is connected in parallel with resistor 58 so that the combination of capacitor 60 and resistor 58 acts as a differentiating filter for gating signals that are periodically applied to the control terminals 48 and 50 to speed up the switching of the transistor 24 between conducting and non-conducting states. In operation the transistor 24 is in a conducting state during intermittant intervals determined by the pulse width of the gating signals, and it will change states at a frequency corresponding to the gating signal frequency.

Because the DC to DC converter 10 is arranged so that current always flows from the terminal 16 to the terminal 18 through the transformer primary winding 20, it is necessary to reset the transformer flux level after each current pulse in order to avoid saturation. Accordingly, there is provided a reset winding 62 within the transformer 22. In one embodiment the reset winding is connected across the output terminals 38 and 40 of the power circuit 10 whereby, because winding 62 is reverse wound with respect to the other windings of transformer 22, the output voltage forces a current through winding 62 which drives the transformer flux in a direction to avoid saturation. Current through the winding 62 is limited by series connected resistor 64 and inductor 66 in the winding 62 current path. As will be shown hereinafter, an alternative arrangement is to provide a separate power supply for exciting the reset winding 62. Where several power circuits are used, the reset windings may be serially connected.

The $\phi 2$ conversion unit 14 is identical to the $\phi 1$ unit 12 and is provided with power input terminals 68 and 70 between which are connected a power switching transistor 72 and a primary winding 74 of a transformer 76. A secondary winding 77 of transformer 76 has one terminal connected to power output terminal 40 of the associated power circuit 10 and a second terminal connected through a diode 78 and filter reactor 80 to power output terminal 38. It is therefore apparent that the serially connected combinations of transformer primary winding and transistor in the respective conversion units 12 and 14 are separate from and independent of each other, but the transformer secondary winding and rectifying means in these two units share the common pair of output terminals 38, 40. Gating signals for transistor 72 are periodically applied to control terminals 82 and 84 from which terminals they are coupled through a signal transformer 86 and applied across the base-emitter junction of transistor 72. These signals are supplied in synchronism with but at different times than the state-changing signals received at the control terminals 48, 50 of the phase one unit 12, whereby the transistor 72 is in a conducting state during intervals that are staggered with respect to the intermittent conducting intervals of the transistor 24. Power transformer 76 is also provided with a reset winding 88 which is serially connected in a current path with reset winding 62.

As disclosed in the aforementioned Hedel patent application, a power balancing arrangement is necessary in order to insure that the average currents supplied by each of the conversion units 12 and 14 are equal so that transistor currents are equalized and ripple currents are minimized. Thus, appropriate current measuring devices are provided for each unit 12 and 14. In FIG. 1, these measuring devices are indicated as current sensing coils 90 and 92 connected, respectively, in the emitter circuits of transistors 24 and 72. The coil 90 provides an output current signal indicated as $I_{\phi 1}$ at terminals 94 and 96. Similarly, the coil 92 provides an output current signal indicated as $I_{\phi 2}$ at terminals 98 and 100. The signals $I_{\phi 1}$ and $I_{\phi 2}$ are representative of the current flowing through the transistors 24 and 72 during their respective conduction intervals. As will be explained hereinafter, one of the advantages of the present invention is the avoidance of the necessity of supplying current sensing coils in each conversion unit when the power circuits are connected in a series arrangement.

The power circuit 10 is explained and its operation detailed in the aforementioned Hedel patent application. In essence a signal is applied to terminals 48 and 50 to gate transistor 24 into conduction for a predetermined portion of a first "half-cycle." Thereafter, a signal is applied to terminals 82 and 84 to gate transistor 72 into conduction for a second "half-cycle." This causes the transistors 24 and 72 periodically to change states in a staggered switching mode, whereby the transformer secondary windings 32 and 78 provide interdigitated pulses of current to the output terminals 38 and 40 of the power circuit 10. The rectifying diodes 34 and 78 assure that the output current from the terminals 38 and 40 of the converter 10 is unidirectional and the voltage developed is of the desired polarity. The filter reactors 36 and 80 in conjunction with a filter capacitor 102 connected between the output terminals 38 and 40 serve to smooth the output current so that it is relatively ripple free. The average magnitude of the output voltage is controlled by adjusting the duty cycles of the transistors 24 and 72 (i.e., the ratio of the time that the transistor is in a conducting state to its total conducting and non-conducting times per cycle of operation).

Figure 2:
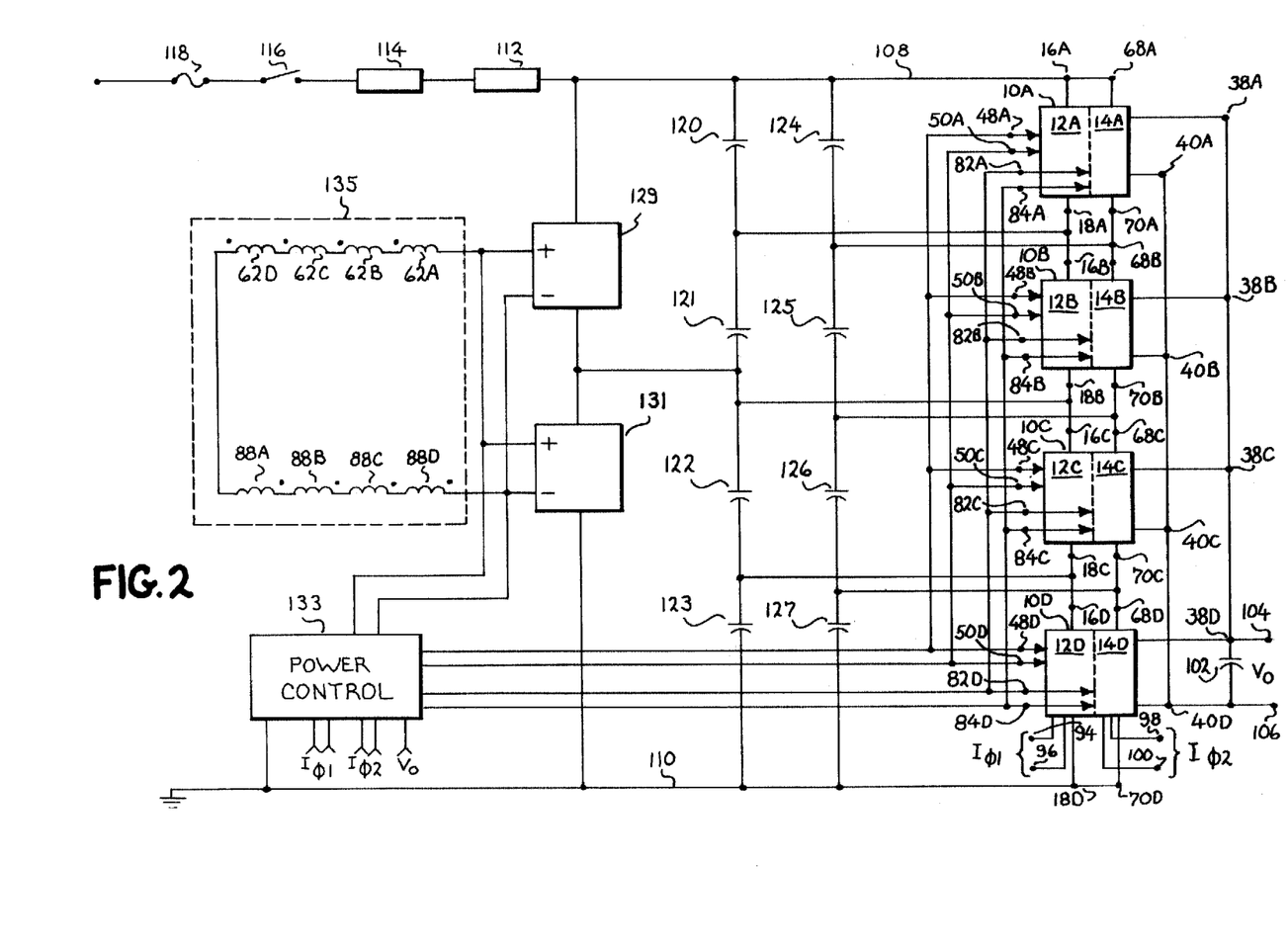
FIG. 2 is a simplified block diagram of a preferred embodiment of the power converter arrangement of this invention.

Referring now to FIG. 2, there is shown a block diagram of a preferred embodiment of the present invention. The blocks labeled 10A, 10B, 10C and 10D each represent a converter power circuit substantially identical to the circuit 10 illustrated in FIG. 1 (except for the omission of the current measuring means 90, 92 in three of the four blocks). Each of the converter power circuits includes respective power output terminals 38A, B, C or D and 40A, B, C or D. The terminals 38A, 38B, 38C and 38D are all connected to a first output power bus or terminal 104 and the terminals 40A, 40B, 40C and 40D are connected to a second output power bus or terminal 106. With this arrangement the power circuits 10A, 10B, 10C and 10D are effectively connected in parallel to the output power buses, whereby the electric load (not shown) is supplied with the sum of the currents from the four converters. The filter capacitor 102 is connected between the common terminals 104 and 106.

The signal input terminals of each of the converter power circuits corresponding to the control terminals 48, 50, 82 and 84 of the circuit 10 of FIG. 1 are identified with the same numbers followed by an appropriate letter suffix indicative of a particular circuit 10A, 10B, 10C or 10D with which the terminals are associated. All the terminals 48 and 50 are connected so that a first periodic gating signal is simultaneously applied to all the phase one conversion units 12A, 12B, 12C and 12D for causing their respective power transistors (24) to change states in unison. Similarly, all the terminals 82 and 84 are connected so that a second alternate periodic gating signal is simultaneously applied to all the phase two conversion units 14A, 14B, 14C and 14D, whereby the respective power transistors (72) in these units change states in unison with each other and in a staggered pattern with respect to the transistors in the phase one units.

The converter power circuits 10A, 10B, 10C and 10D are each provided with power input terminals corresponding to the terminals 16, 18, 68 and 70 of the power circuit illustrated in FIG. 1. The power input terminals are accordingly numbered as in FIG. 1 but with subscripts A, B, C or D indicating, respectively, their association with power circuits 10A, 10B, 10C or 10D. The terminals 16A and 68A of power circuit 10A are connected to a relatively positive potential input power bus 108. The terminals 18A and 70A of power circuit 10A are connected, respectively, to input terminals 16B and 68B of power circuit 10B. In this manner a plurality of power circuits such as power circuit 10 can be serially connected across a power source such that each power circuit is subjected to only a proportionate fraction of the source potential, whereby relatively low voltage power transistors can be safely used in the respective power circuits. In the present example four such power circuits are shown although the number can be reduced or increased as desired to meet power output or voltage input requirements. The final power circuit, i.e., 10D in the embodiment of FIG. 2, has its input terminals 16D and 68D connected, respectively, to the terminals 18C and 70C of the immediately preceding power circuit 10C. The terminals 18D and 70D of power circuit 10D are connected to the relatively negative potential input power bus 110.

The power bus 108 is connected to a relatively positive potential terminal of a DC power source (not shown) through a line inductor 112, a noise filter 114, a line breaker 116 and a current limit fuse 113. The bus 110 is connected to a relatively negative potential terminal of the DC power source. The voltage developed between buses 108 and 110 is divided into a number of equipotential parts by a capacitive voltage divider comprising eight equal value capacitors. Half of these capacitors form a first series connected string of capacitors 120, 121, 122, and 123, and the other half form a second series connected string of capacitors 124, 125, 126 and 127, each of the series strings of capacitors being connected between the buses 108 and 110.

The first series string of capacitors is associated with the phase one ($\phi 1$) conversion units of the power circuits 10A, 10B, 10C and 10D. More specifically, the capacitor 120 is connected across the input terminals 16A and 18A of power circuit 10A, the capacitor 121 is connected across the input terminals 16B and 18B of power circuit 10B, the capacitor 122 is connected across the input terminals 16C and 18C of power circuit 10C, and the capacitor 123 is connected across the input terminals 16D and 18D of power circuit 10D. In the second string of capacitors, the capacitor 124 is connected across the input terminals 68A and 70A of power circuit 10A, the capacitor 125 is connected across the input terminals 68B and 70B of power circuit 10B, the capacitor 126 is connected across the input terminals 68C and 70C of power circuit 10C, and the capacitor 127 is connected across the input terminals 68D and 70D of power circuit 10D.

As will be apparent from the above described arrangement, the $\phi 1$ conversion units are associated with the first series connected string of capacitors 120, 121, 122 and 123 whereas the $\phi 2$ conversion units are associated with the second series connected string of capacitors 124, 125, 126 and 127. In contrast the prior art has suggested that only a single capacitive voltage divider string need be used. For example, such an arrangement is shown in U.S. Pat. No. 4,062,057. However, we have discovered that use of a single capacitive voltage divider network requires very expensive and careful matching of the components in all the power circuits in order to balance transistor currents between the $\phi 1$ and $\phi 2$ units. Furthermore, even when the components are matched, the balance cannot be maintained over the normal temperature range of operation. Balancing of the currents is possible if current transformers are provided for each of the individual conversion units and if individual balance control circuits are provided for each power circuit.

As part of our invention, we have split the input capacitor string into two separate capacitor strings. Each capacitor in our arrangement is subject to the same voltage rating but need only be one-half of the former microfarad capacitance rating. In addition, the $\phi 1$ transistors for each power circuit are in series and the $\phi 2$ transistors for each power circuit are in series so that only a single balancing circuit is required to force the average current in each conversion unit to balance. Thus, only the power circuit 10D is shown as including current monitor devices for providing current signals $I_{\phi 1}$ and $I_{\phi 2}$ at output terminal pairs 94, 96 and 98, 100, respectively.

FIG. 2 also illustrates the use of two power supplies 129 and 131 which are adapted to provide the low voltage power for the power control circuit 133 which regulates the output voltage developed across capacitor 102. Because of the relatively high voltage developed between buses 108 and 110, two power supplies working against the center tap between capacitors 121 and 122 are used rather than only one supply.

The block 135 represents the series connection of all the reset windings of the power circuits 10A, 10B, 10C and 10D. As mentioned previously, where a plurality of conversion units are employed, a separate power supply may be provided for the reset windings rather than tap the reset current from the available output power at capacitor 102.

Figures 3, 3A:
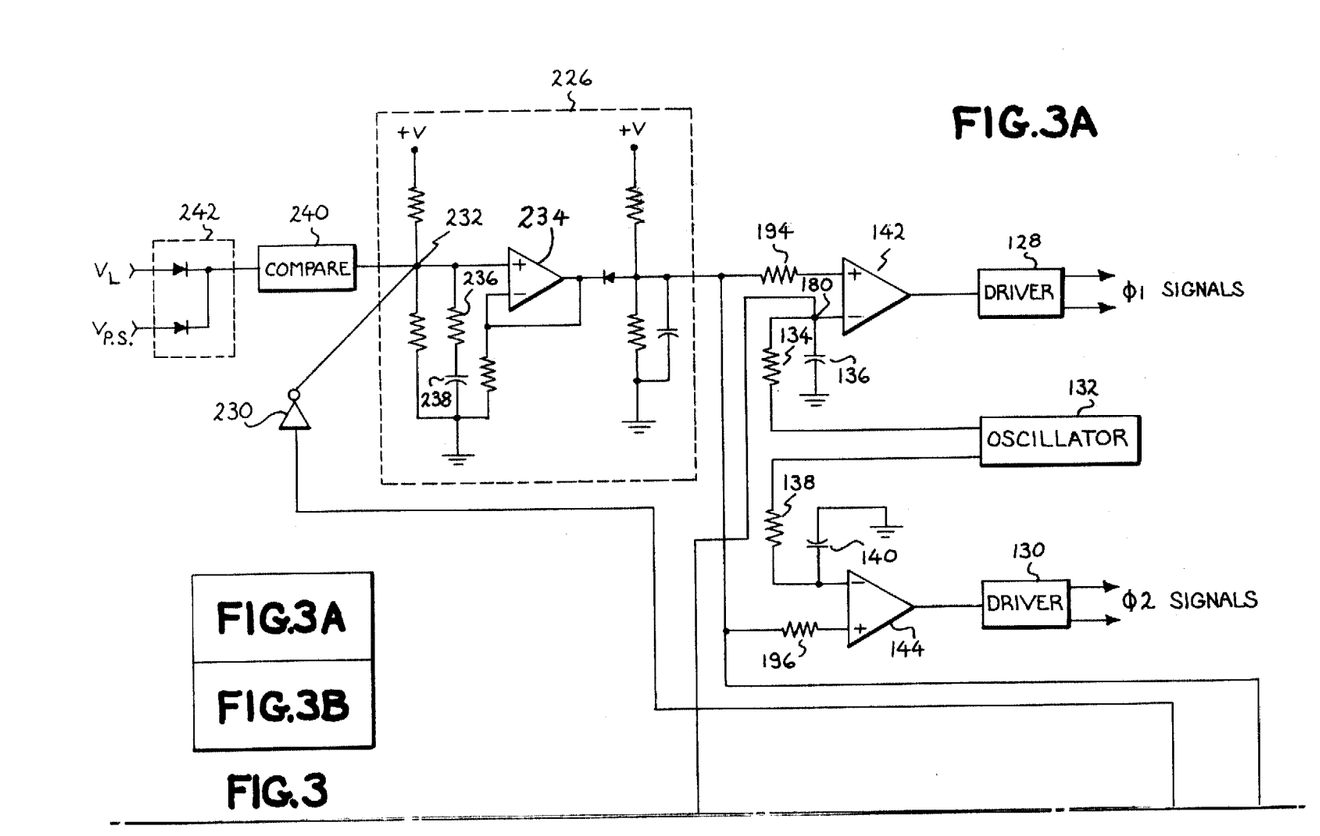
FIG. 3 is a block diagram showing the relationship between FIGS. 3A and 3B.
FIGS. 3A and 3B are simplified schematic diagrams of a control circuit for use with the power circuit of FIG. 2.
Figure 3B:
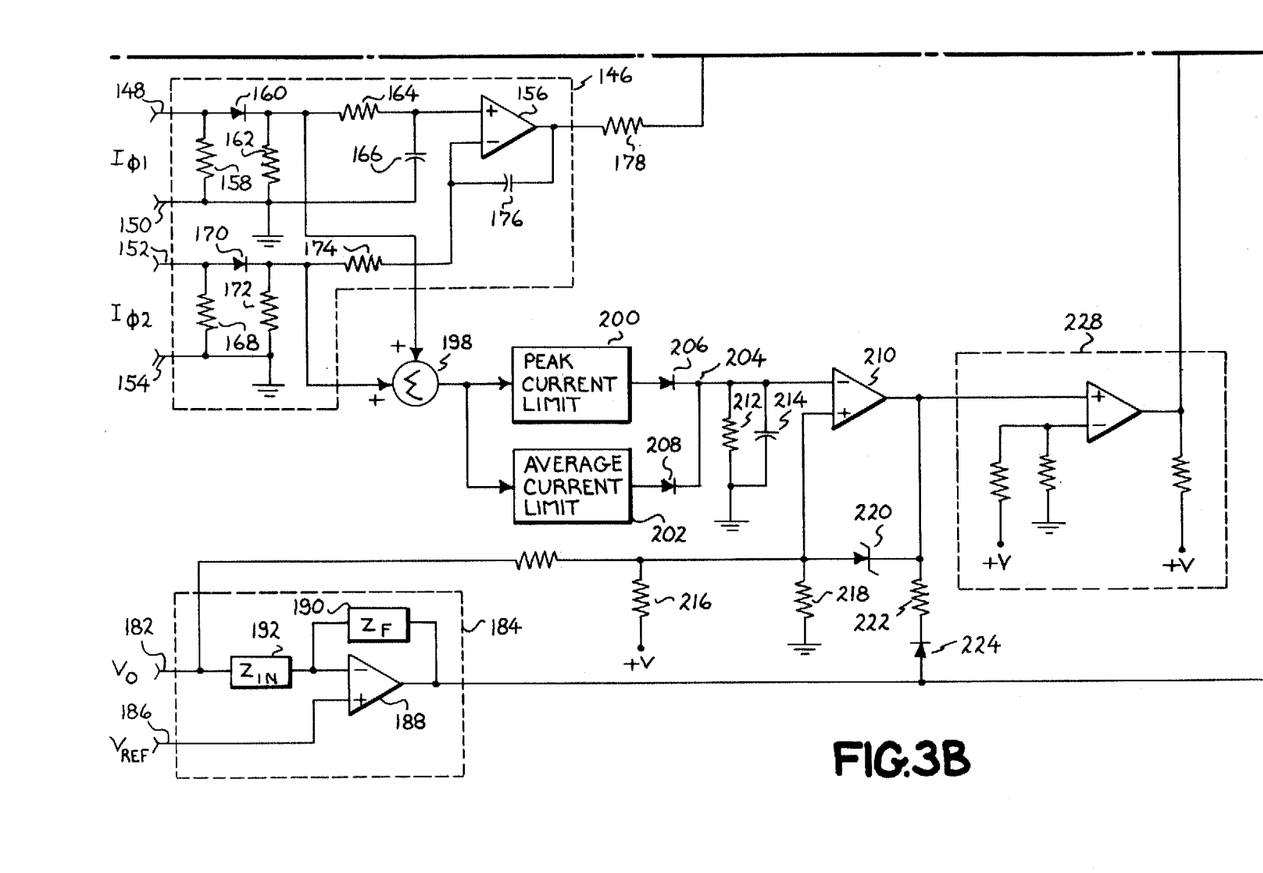

Referring now to FIGS. 3A and 3B, there is shown a more detailed schematic and block diagram of the power control circuit 133 first and second periodic state-changing signals for alternatively gating the power transistors in the phase one and phase two conversion units of the power circuits 10A, 10B, 10C and 10D are supplied from transistor gate driver circuits 128 and 130 of a type well known in the art. The gating signals are initiated by a circuit including a two-phase oscillator 132 which generates two square-wave signals that are 180° out of phase from one another. The square-wave signals are each converted to triangular waveforms by integration networks comprising, respectively, a resistor 134 and capacitor 136 and a resistor 138 and capacitor 140. The triangular waveforms are applied to respective comparators 142 and 144 where they are compared with signals representing any difference between the measured average voltage magnitude and the desired voltage magnitude in order to generate gating signals at appropriate times for controlling the duty cycles of the power stages 10A, 10B, 10C and 10D in a manner to minimize that difference.

In order to balance the current provided by the $\phi 1$ conversion units 12A, 12B, 12C and 12D against the current provided by the $\phi 2$ conversion units 14A, 14B, 14C and 14D there is provided a balance correction circuit 146 (FIG. 3B) connected for receiving the $I_{\phi 1}$ and $I_{\phi 2}$ current signals produced by the current monitoring devices in power circuit 10D. Balance circuit 146 includes first input terminals 148 and 150 for receiving the $I_{\phi 1}$ signal and second input terminals 152 and 154 for receiving the $I_{\phi 2}$ signal. Because the $I_{\phi 1}$ and $I_{\phi 2}$ signals are pulse signals, the signals are rectified and filtered before being applied to an amplifier 156. The $I_{\phi 1}$ signal is applied across a resistor 158 connected between terminals 148 and 150 and the series combination of a rectifying diode 160 and resistor 162 connected in parallel with resistor 158. The signal developed at the junction intermediate diode 160 and resistor 162 is coupled through a resistor 164 to a non-inverting input terminal of amplifier 156. A filter capacitor 166 is connected between the non-inverting input terminal of amplifier 156 and the input terminal 150, which input terminal is also connected to signal ground.

Similarly, the $I_{\phi 2}$ signal is applied across a resistor 168 connected between terminals 152 and 154. The series combination of a rectifying diode 170 and resistor 172 is connected in parallel with resistor 168. The junction mediate diode 170 and resistor 172 is connected through a resistor 174 to an inverting input terminal of amplifier 156. Input terminal 154 is also connected to signal ground.

The amplifier 156 is connected as an integrating amplifier and as such has a feedback capacitor 176 connected between its inverting input terminal and its output terminal. The signal that develops at the output terminal of amplifier 156, and the output of the circuit 146, is representative of the average difference between the $I_{\phi 1}$ and $I_{\phi 2}$ signals. This difference signal is coupled through a resistor 178 to a junction 180 at the inverting input terminal of amplifier 142 (FIG. 3A). The difference signal acts as an offset to the triangular waveform developed at junction 180 and thus varies the pulse width of the gate signal applied to the $\phi 1$ conversion units in a manner to minimize the difference signal.

Regulation of the output voltage produced by the power circuits 10 is accomplished by a feedback circuit of a type well known in the art. The output voltage is monitored and a signal Vo representative thereof is coupled to an input terminal 182 of an amplifier circuit 184. As is shown in FIG. 3B, a second input terminal 186 of circuit 184 is connected to receive a reference signal $V_{ref}$ representative of a desired magnitude of output voltage. The circuit 184 may be a common type of operational amplifier arrangement including a high gain amplifier 188, a feedback impedance 190 connected between the inverting input terminal and an output terminal of amplifier 188 and an input impedance 192 connected between input terminal 182 and the inverting input terminal of amplifier 188. The input terminal 186 is connected to the non-inverting input terminal of amplifier 188. The output terminal of amplifier circuit 184 is connected to the non-inverting input terminals of both amplifiers 142 and 144 (FIG. 3A) through input resistors 194 and 196, respectively. The amplifiers 142 and 144 compare the voltage error signal produced by amplifier circuit 184 to the triangular waveform and produce gate drive signals at the appropriate crossover points.

The $I_{\phi 1}$ and $I_{\phi 2}$ signals are also utilized as input signals to a current limit circuit which monitors both peak current and average current. The rectified current signal developed at the junction of diode 160 and resistor 164 (FIG. 3B) is applied to a first input terminal of a summing junction 198. A second input terminal of junction 198 is connected to the junction mediate diode 170 and resistor 174. The output signal developed by summing junction 198 thus represents the total current supplied by all the power circuits 10A, 10B, 10C and 10D. An output terminal of junction 198 is connected to input terminals of both a peak current limit circuit 200 and an average current limit circuit 202. Both limit circuits 200 and 202 are essentially level detectors of a type well known in the art. Their differences are primarily in the level of current to which each is responsive. For example, the peak limit circuit 200 is preferably biased to respond to a current surge of short duration which exceeds the average current limit level by about twenty percent. The output signals developed by both circuits 200 and 202 are coupled to a common junction 204 via a diode OR circuit comprising the diodes 206 and 208.

The junction 204 is connected to an inverting input terminal of an amplifier 210. An integrator comprising a resistor 212 and capacitor 214 is connected between junction 204 and signal ground. The integrator eliminates false detections and also serves to hold the system off for a reasonable time when a true current is observed. The amplifier 210 is connected as a comparator and as such has a bias applied to its non-inverting input terminal by means of a voltage divider comprising the resistors 216 and 218 which are serially connected between a voltage source +V and signal ground with the junction mediate the resistors connected to the non-inverting input terminal. Furthefore, when triggered, amplifier 210 is held in a latched state until the trigger signal drops below a pre-determined level. This latter function is achieved by a Zener diode 220 connected between the non-inverting input terminal and an output terminal of amplifier 194.

Signals developed at the output terminal of amplifier 210 are coupled through a resistor 222 and a diode 224 to the output terminal of circuit 184. Since amplifier 210 in the illustrated embodiment acts as a comparator to switch its output state to a relatively negative voltage on an overcurrent condition, the effect of an overcurrent detection is to pull the error signal applied to amplifiers 142 and 144 to a negative level whereby no gating signals can be generated.

In the event of a shutdown due to an overcurrent condition, it is desirable to prevent the system from being suddenly turned on at the former current level. The preferred operation is to slew the gating signals gradually to get the output voltage back to its desired level. Accordingly, there is provided a "slow-on" circuit 226 (FIG. 3A) whose output is also connected to the junction of resistors 194 and 196. One of the input signals to the circuit 226 is the overcurrent signal from amplifier 210 (FIG. 3B) which is connected to the circuit 226 through a comparator 228 and an inverter 230. The overcurrent signal is applied to a junction 232 at the non-inverting input terminal of an amplifier 234. An integrator comprising resistor 236 and capacitor 238 is discharged by the signal from comparator 228 and the capacitor charge time established by the integrator sets the slew rate for returning the gate signals to their desired level. Since the circuit 226 is well known in the art, no further description of its components is deemed necessary.

In addition to the overcurrent function, the present system also incorporates voltage monitoring to assure that the available line voltage is within the desired operating range of the power circuits 10 and that the voltage generated by the system's DC power supplies are within a desired range. Such monitoring arrangements are commonly known and utilized and therefore no details of such arrangements are included herein. In our system a signal $V_L$ representative of line voltage magnitude is applied to a comparator 240 through a diode OR circuit 242 (FIG. 3A). A signal $V_{PS}$ representative of power supply voltage magnitude is also applied through OR circuit 242 to comparator 240. If the signals $V_L$ or $V_{PS}$ indicate either an overvoltage or undervoltage condition, the comparator 240 provides a signal to junction 232 in circuit 226 to force the termination of gate signals supplied by amplifiers 142 and 144.

A distinct advantage of the present invention is the modularity concept which it offers. The control function is essentially independent of the number of power converters in the system. The power control unit depends only on the monitored system output voltage and currents flowing in the final stagger-mode converter in the series string of converters. Accordingly, converters can be added to or deleted from the string as desired to vary the power handling capability of the system without changing the control system.

While a preferred embodiment of our invention has been shown by way of illustration, other embodiments and modifications will become apparent to those skilled in the art. We therefore intend, by the concluding claims, to cover all such modifications as fall within the true spirit and scope of the invention.

What we claim and desire to secure by Letters Patent of the United States is:

1. Voltage conversion apparatus for converting a first DC voltage of high magnitude between a pair of input power buses to a second DC voltage between a pair of output power buses, said apparatus comprising:

a. a plurality of staggered-mode DC to DC converters, each of said converters including first and second independent conversion units sharing a common pair of power output terminals, with each of said units comprising first and second power input terminals, a relatively low voltage power switching device having alternative conducting and non-conducting states, control terminals coupled to said switching device, a power transformer having primary and secondary windings, said primary winding being serially connected with said switching device between said input terminals, and rectifying means for connecting said secondary winding to the pair of power output terminals of the associated converter so that the output current from that converter is unidirectional;

b. means for connecting said power input terminals of the first conversion units of all of said plurality of converters in a first series string between the input power buses;

c. means for connecting said power input terminals of the second conversion units of all of said plurality of converters in a second series string between the input power buses, said second string being separate from said first string;

d. a plurality of equal value voltage dividing capacitors, half of said capacitors being respectively connected across the power input terminals of the conversion units forming said first string and the other half of said capacitors being respectively connected across the power input terminals of the conversion units forming said second string;

e. means for connecting the pairs of power output terminals of all of said plurality of converters in parallel to the output power buses, whereby the output buses are supplied with the sum of the output currents from said converters;

f. a filter capacitor connected between said output power buses; and g. control means connected to the control terminals of said first and second conversion units of all of said converters for simultaneously applying to the control terminals of said first units a first periodic state-changing signal that causes the respective switching devices of said first units to be in conducting states during predetermined intermittent intervals and for simultaneously applying to the control terminals of said second units a second periodic state-changing signal that causes the respective switching devices of said second units to be in conducting states during intervals that are staggered with respect to said predetermined intermittent intervals.

2. The apparatus as defined in claim 1 wherein said control means includes regulating means for controlling the duty cycles of the switching devices in the conversion units of each of said plurality of converters in a manner to maintain a desired average magnitude of voltage between said output power buses.

3. The apparatus as defined in claim 2 and further including power balancing means comprising:

a. means for producing first and second signals representative, respectively, of currents in the transformer primary windings of the first and second conversion units of one of said converters;

b. means for comparing said first and second signals and for generating an error signal representative of any difference therebetween; and c. means responsive to said error signal for varying the duty cycle of the switching device in each of the first conversion units with respect to the duty cycle of the switching device in each of the second conversion units so as to minimize said error signal.

4. The apparatus of claim 6 wherein the power transformer in each conversion unit of said converters includes a reset winding and the reset windings of the respective transformers in said first and second conversion units of all of said converters are connected in a series arrangement across a DC power source.

5. The apparatus of claim 4 wherein said DC power source comprises said output power buses.

* * * * *